United States Patent [19]

Gaedcke et al.

[11] Patent Number: 4,643,772
[45] Date of Patent: Feb. 17, 1987

[54] PREPARATION OF A MIXED-PHASE PIGMENT BASED ON IRON OXIDE AND CHROMIUM OXIDE

[75] Inventors: Harald Gaedcke, Leonberg; Ruediger Braun, Roesrath; Roland Bauer, Bergisch-Gladbach, all of Fed. Rep. of Germany

[73] Assignee: BASF Aktiengesellschaft, Ludwigshafen, Fed. Rep. of Germany

[21] Appl. No.: 762,204

[22] Filed: Aug. 5, 1985

[30] Foreign Application Priority Data

Aug. 11, 1984 [DE] Fed. Rep. of Germany ....... 3429678

[51] Int. Cl.$^4$ ................................................. C09C 1/24
[52] U.S. Cl. ..................................... 106/304; 106/309
[58] Field of Search ................ 106/304, 309; 423/607, 423/632

[56] References Cited

U.S. PATENT DOCUMENTS

| | | | |
|---|---|---|---|
| 4,069,164 | 1/1978 | Dezawa et al. | 427/127 |
| 4,125,474 | 11/1978 | Dezawa et al. | 427/127 |
| 4,482,645 | 11/1984 | Jennings et al. | 502/316 |

*Primary Examiner*—Amelia B. Yarbrough
*Attorney, Agent, or Firm*—Oblon, Fisher, Spivak, McClelland, & Maier

[57] ABSTRACT

A process for the preparation of a mixed-phase pigment based on iron oxide and chromium oxide by heating a mixture of the oxides, hydroxides or oxide hydroxides of iron and of chromium at from 600° to 1100° C. and then comminuting the product and working it up in a conventional manner. The essential feature of the invention is that a mixture of transparent α-iron oxide having an orthorhombic bipyramidal crystal structure and a chromium(III) hydroxide, which has been applied onto the transparent iron oxide by precipitation with an alkali, preferably sodium carbonate, is heated.

The pigments according to the invention give deep colorations and are readily dispersible.

20 Claims, No Drawings

PREPARATION OF A MIXED-PHASE PIGMENT BASED ON IRON OXIDE AND CHROMIUM OXIDE

BACKGROUND OF THE INVENTION

1. Field of the Invention

This invention relates to the preparation of mixed-phased pigments.

2. Discussion of the Background

Mixed-phase pigments are known. Mixed-phase pigments based on iron oxide and chromium oxide belonging to the (Fe, Cr)$_2$O$_3$ system have also been described. The last-mentioned products are also used in the form of chrome iron brown, and demand for them in the plastics industry for coloring construction components, eg. window profiles, is growing since they possess excellent fastness properties. However, the tintorial properties, such as particLe fineness, dispersibility and color yield, of the chrome iron brown pigments commercially available to date have not so far completely met the high requirements set by the plastics industry.

Mixed-phase pigments are manufactured in general by reacting the oxide components in the solid state at from 800° to 1400° C. This method of production results in pigments which have a very large particle diameter and extensive sintered fractions which, in spite of milling, give pigments which do not meet higher requirements. The use of particularly finely divided oxides, hydroxides, or other compounds to produce a good mixture in aqueous suspension did not result in any substantial improvement, nor were sufficient improvements achieved by using mixtures, such as hydroxides or carbonates, which were prepared by coprecipitation of aqueous salt solutions.

Processes which lead to homogeneous brown products of the general composition (Fe, Cr)$_2$O$_3$, in which decomposed iron and chromium compounds are ignited at fairly high temperatures, are also known. However, such processes, which generally start from the corresponding carbonyl compounds of the metals, are inconvenient and expensive because the starting materials are comparatively difficult to obtain. Moreover, the properties of the brown pigments obtained by these processes do not meet the requirements set.

SUMMARY OF THE INVENTION

It is an object of the present invention to prepare mixed-phase pigments based on iron oxide/chromium oxide which possess good lightfastness and fastness to weathering and are superior to the conventional chrome iron brown pigments, particularly with regard to particle fineness, dispersibility and color yield or color strength. Moreover, these pigments should be capable of being prepared by a comparatively simple method.

We have found that this object is achieved by the process according to the invention. The present invention relates to a process for the preparation of a mixed-phase pigment based on iron oxide and chromium oxide by heating a mixture of the oxides, hydroxides or oxide hydroxides of iron and of chromium at from 600° to 1100° C., comminuting the product and working it up in a conventional manner, wherein a mixture of a transparent α-iron oxide having an orthorhombic bipyramidal crystal structure and a chromium(III) hydroxide, which has been applied onto the transparent iron oxide by precipitation with an alkali, preferably sodium carbonate, is heated.

DETAILED DESCRIPTION OF THE PREFERRED EMBODIMENTS

The result in terms of the tinctorial properties of the products was surprising. If the process is carried out using a high-hiding iron oxide yellow having the same chemical composition, the resulting pigments possess substantially coarser particles, a lower color yield (color strength) and a duller hue. Even when the high-hiding iron oxide yellow is milled thoroughly beforehand, the tinctorial properties of the pigment obtained are inferior to those of the brown pigment obtained by the novel process.

The result obtained was also unexpected since the use of other iron oxides which do not possess the crystal forms defined above and consist of, for example, amorphous iron oxide hydroxide gives only hard, very poorly dispersible pigments having a low color strength.

The transparent α-iron oxides required as starting materials and having an orthorhombic bipyramidal crystal structure are known and can be prepared by one of the conventional processes disclosed in the patent literature.

Preferred starting materials are those transparent iron oxides whose primary particles are from 0.05 to 0.8 μm, in particular from 0.1 to 0.4 μm, in size. These give brown pigments having particularly good tinctorial properties and performance characteristics.

In contrast, acicular iron oxides 1.2 μm long only give brown pigments which produce less brilliant and less intense colorations.

The mixture of the transparent α-iron oxide and the chromium(III) hydroxide is obtained by precipitating a solution of a chromium(III) salt in the presence of the iron oxide with an alkali, preferably sodium carbonate or potassium carbonate. Precipitation is carried out at from room temperature to 95° C., preferably from 40° to 80° C.

The precipitate (the mixture) is filtered off, washed and dried, and the dry mixture is then heated in a conventional manner at from 600° to 1100° C. Heating is effected by a conventional method, for example in a bogie hearth furnace, a rotary tube furnace or a similar furnace.

The hue of the pigments is altered from pale brown through medium brown to deep dark brown shades by increasing the amount of chromium oxide.

Hues of particular interest to the surface coatings and plastics industries are obtained when the ratio of iron oxide to chromium oxide is from 55:45 to 97:3.

To a lesser extent, the tinctorial properties of the products are also influenced by the temperature during heating (calcining temperature). In this case, the skilled worker can readily determine the particular optimum temperature as a function of the furnace design and the residence time, by means of simple experiments. Thus, for example, optimum results are obtained at 920° C. for a ratio of iron oxide to chromium oxide of 80:20.

Pigments having particularly superior tinctorial properties and performance characteristics are obtained when, in the course of working up, the heated material is subjected to wet-milling in a ball mill, sand mill, bead mill or similar mill.

If necessary, wetting agents and/or other conventional additives which are added to pigments in order to achieve certain improved properties can be introduced into the suspension of the mill stock before the latter is isolated.

Suitable wetting agents are the conventional organic surfactants. Examples of further conventional additives are aluminas, phosphates, amines and fatty acids, which are usually mixed with the pigments as dispersants, lubricants, etc. for further processing.

EXAMPLE 1

503 kg of hydrated chromium(III) sulfate (26% $Cr_2O_3$) are dissolved in an aqueous, neutral suspension of 460 kg of transparent iron oxide yellow (prepared by a method disclosed in the patent literature) in 6000 l of water, and a sodium carbonate solution (concentration 168 g per liter) is then added to bring the pH to 7.2. Dissolution of the chromium sulfate and the subsequent precipitation with sodium carbonate are carried out at from 70° to 80° C. The suspension is filtered, and the residue is washed and dried. The dry olive green product is calcined at about 930° C. The reaction product is wet-milled in a ball mill, and then filtered off and finally washed and dried. The dry pigment is milled in a turbomill. 520 kg of pigment are obtained. The ratio of $Fe_2O_3$ to $Cr_2O_3$ is 75:25. The pigment can be dispersed with high color yield and produces brilliant dark brown colorations.

Virtually the same result is obtained if a commercially available transparent α-iron oxide yellow pigment having an orthorhombic bipyramidal crystal structure is used as the iron oxide.

Instead of wet-milling in a ball mill, the aqueous suspension may also be milled in a sand mill or in a bead mill. In both cases, the resulting brown pigments have virtually the same tinctorial properties and performance characteristics.

EXAMPLE 2

In order to prepare a pale brown chrome iron brown, the procedure described in Example 1 is followed except that only 175 kg of hydrated chromium sulfate (26% of $Cr_2O_3$) are used instead of 503 kg. After the dissolution step, the procedure is continued as described in Example 1. The mixture is heated at from 900° to 910° C. 430 kg of pigment are obtained in the form of a pale brown powder which produces extremely brilliant colorations. The ratio of $Fe_2O_3$ to $Cr_2O_3$ is 90:10. The performance characteristics of the pigment are similar to those of the pigment obtained as described in Example 1.

We claim

1. A process for the preparation of a mixed-phase pigment based on iron oxide and chromium oxide, wherein a mixture of a transparent α-iron oxide having an orthorhombic bipyramidal crystal structure and a chromium(III) hydroxide, which is prepared by precipitation with an alkali onto the transparent iron oxide, is heated at from 600° to 1100° C. and then comminuted and then worked up.

2. A process as claimed in claim 1, wherein the mixture of iron oxide and chromium(III) hydroxide which is heated is obtained by precipitating the chromium hydroxide by means of sodium carbonate.

3. A process as claimed in claim 1, wherein a mixture is used whose transparent iron oxide consists of acicular primary particles of from 0.05 to 0.8 μm.

4. A process as claimed in claim 2, wherein a mixture is used whose transparent iron oxide consists of acicular primary particles of from 0.05 to 0.8 μm.

5. A process as claimed in claim 1, wherein a mixture is used whose primary iron oxide consists of acicular primary particles of from 0.1 to 0.4 μm.

6. A process as claimed in claim 2, wherein a mixture is used whose transparent iron oxide consists of acicular primary particles of from 0.1 to 0.4 μm.

7. A process as claimed in claim 2, wherein the ratio of iron oxide to chromium oxide is from 55:45 to 97:3.

8. A process as claimed in claim 3, wherein the ratio of iron oxide to chromium oxide is from 55:45 to 97:3.

9. A process as claimed in claim 5, wherein the ratio of iron oxide to chromium oxide is from 55:45 to 97:3.

10. A process as claimed in claim 6, wherein the ratio of iron oxide to chromium oxide is from 55:45 to 97:3.

11. A process as claimed in claim 1, wherein the heated mixture is subjected to wet-milling in a ball mill, sand mill or bead mill.

12. A process as claimed in claim 7, wherein the heated mixture is subjected to wet-milling in a ball mill, sand mill or bead mill.

13. A process as claimed in claim 8, wherein the heated mixture is subjected to wet-milling in a ball mill, sand mill or bead mill.

14. A process as claimed in claim 9, wherein the heated mixture is subjected to wet-milling in a ball mill, sand mill or bead mill.

15. A process as claimed in claim 10, wherein the heated mixture is subjected to wet-milling in a ball mill, sand mill or bead mill.

16. A process as claimed in claim 11, wherein a wetting agent, conventional pigment additives or a mixture of these is or are added to the aqueous suspension of the mill base before isolation of the pigment, and the pigment is then isolated.

17. A process as claimed in claim 12, wherein a wetting agent, conventional pigment additives or a mixture of these is or are added to the aqueous suspension of the mill base before isolation of the pigment, and the pigment is then isolated.

18. A process as claimed in claim 13, wherein a wetting agent, conventional pigment additives or a mixture of these is or are added to the aqueous suspension of the mill base before isolation of the pigment, and the pigment is then isolated.

19. A process as claimed in claim 14, wherein a wetting agent, conventional pigment additives or a mixture of these is or are added to the aqueous suspension of the mill base before isolation of the pigment, and the pigment is then isolated.

20. A process as claimed in claim 15, wherein a wetting agent, conventional pigment additives or a mixture of these is or are added to the aqueous suspension of the mill base before isolation of the pigment, and the pigment is then isolated.

* * * * *